Sept. 11, 1951      T. J. O'MEARA      2,567,443
WHEEL GUARD WITH SIGNAL MEANS
Filed April 18, 1949      2 Sheets-Sheet 1
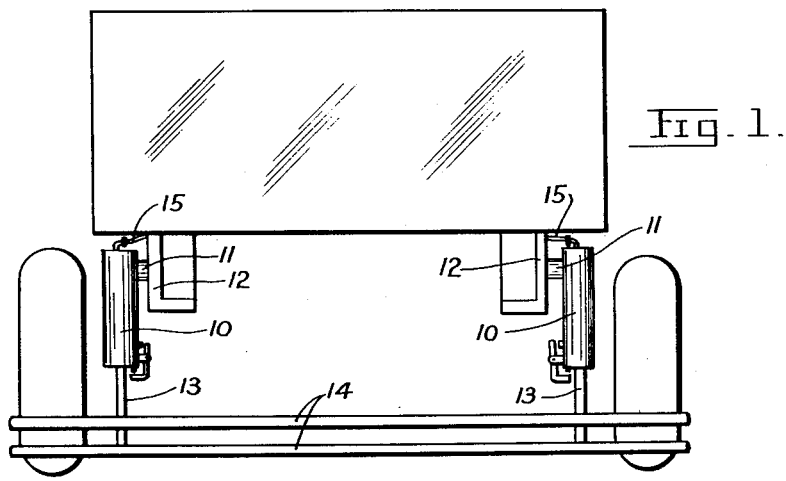
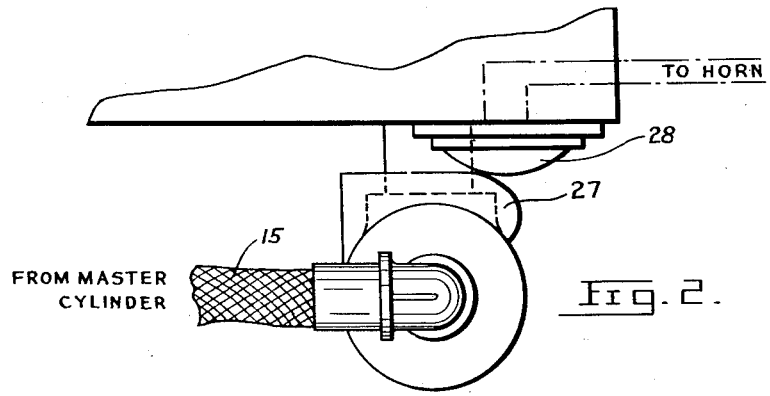
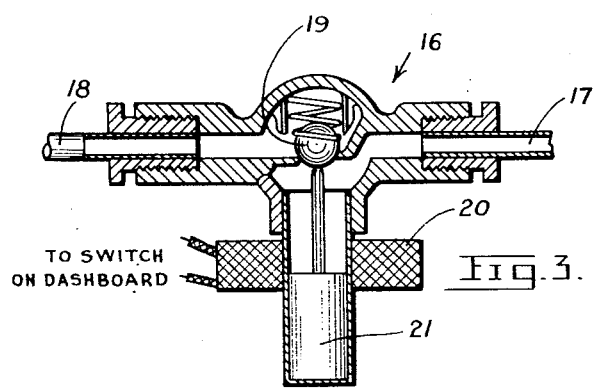
INVENTOR
Thomas J. O'Meara
Ralph Burch
Attorney

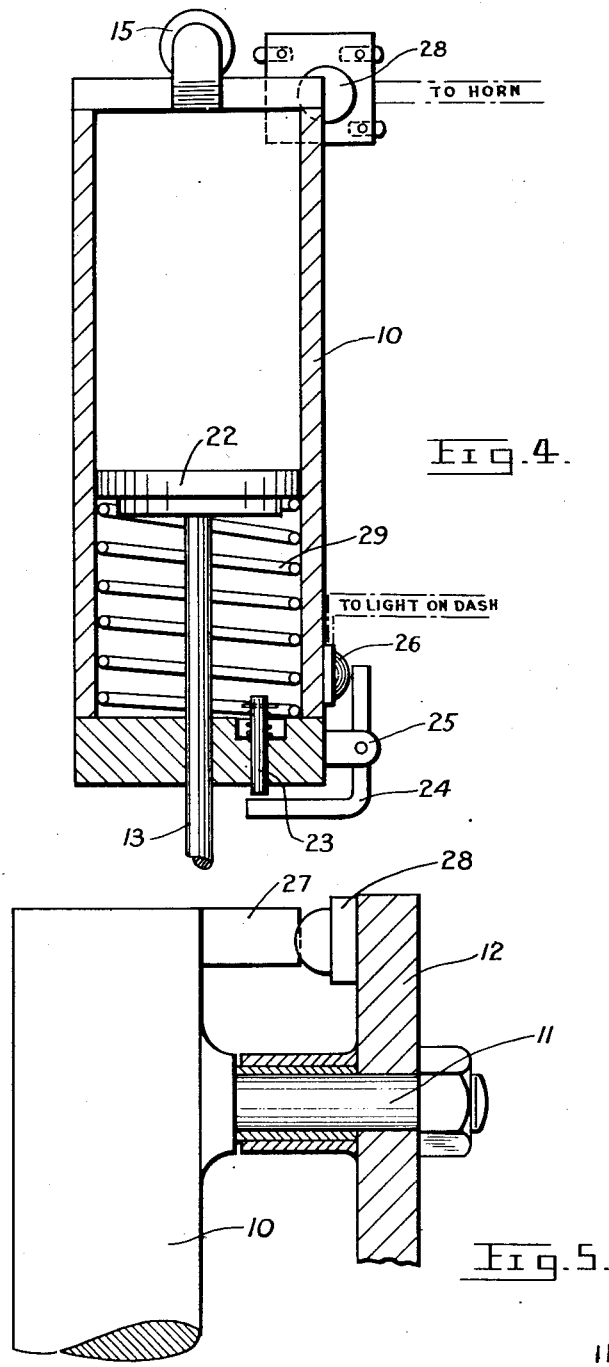

Patented Sept. 11, 1951

2,567,443

UNITED STATES PATENT OFFICE 2,567,443

WHEEL GUARD WITH SIGNAL MEANS

Thomas James O'Meara, Ottawa, Ontario, Canada

Application April 18, 1949, Serial No. 88,108

1 Claim. (Cl. 177—311)

This invention relates to safety devices which are particularly adapted to be used at both extremities of vehicles and which warn the operator that the vehicle has contacted an obstacle.

This type of device will be particularly valuable on large trucks or tramways and will warn the authorized operator that he has contacted an obstacle when backing up the vehicle.

Broadly, the invention comprises a pair of hydraulically operated cylinders mounted at the rear of the vehicle, each cylinder having a piston and piston rod and a pair of transversely disposed auxiliary bumpers mounted on the piston rods. (The device is being described as attached to the rear of the vehicle but nevertheless I wish it to be understood that a similar device may be attached to the front extremity of the vehicle and will operate in exactly the same manner as the one mounted at the rear.) The pistons are so constructed and arranged that when they become in contact with an obstacle they will immediately operate or blow the horn and thus, warn the operator that he has become in contact with an obstacle.

It is to be understood that the device should be installed at a sufficient distance from the wheels to give ample time to the operator, after having been warned to apply his brakes before running over the obstacle. Since operators of large trucks and tramways are often above when backing up for loading or unloading and that small children often become involved in accidents at such time, the device will prove beneficial, not only to the operator, but also to the public at large.

The device is set in operation, that is, lowered to approximately 4 to 6 inches from the ground by first energizing a solenoid control valve. When the valve is opened, the operator actuates the brake pedal and fluid, from the master cylinder is used to lower the pistons of the device.

When the pistons are fully lowered the operator is warned by a signal light on the dash board, at which time the valve is disengaged and the fluid is trapped in the cylinder thus preventing the pistons from returning to their original position.

The main object of the invention is to prevent serious accidents to small children who are often found playing around parked vehicles.

An object of this invention is therefore to provide a safety means to be associated with motor vehicles to warn the operator that the vehicle has come in contact with an obstacle.

Another object is to construct a device which will warn the operator immediately it comes in contact with an obstacle.

With these and other objects in view that may appear as the description proceeds the invention consists in the novel arrangement of the cooperating elements as hereinafter more specifically set forth, claimed and shown in the accompanying drawings forming part of this application and in which:

Fig. 1 is a rear elevational view of a vehicle with my invention shown thereon in the operative position;

Fig. 2 is a fragmentary plan view of the invention showing the cylinder and the warning means associated therewith.

Fig. 3 is a sectional view of the solenoid valve;

Fig. 4 is a longitudinal sectional view through the cylinder and

Fig. 5 is a side elevational view of the cylinder showing the method of mounting same.

Referring more in detail to the drawings in which similar reference characters designate corresponding parts throughout the several views, it will be seen the invention comprises a pair of cylinders 10 pivotally suspended at the rear of a vehicle by means of an axle 11 which is mounted on a plate 12.

The rods 13 of the pistons extend below the cylinder and are arranged with one or more bumper guards 14 transversely thereto. The bumpers, per se, are not to prevent the vehicle from running over an obstacle but merely as a signal for warning the operator that he has contacted an obstacle.

Since the invention is intended as a protection against small children who often wander behind vehicles, it is essential to the efficient operation of the device that the bumper guards be sufficiently low, to be able to strike a young infant who may be sitting on the ground. For this purpose I provide means for lowering the bumpers 14 and means for raising the bumpers when the vehicle is travelling at a normal rate of speed.

The head of the cylinder 10 is connected to the brake master cylinder by means of a flexible tube 15. Since the operation of the brake pedal will have a tendency to drive fluid from the master cylinder to the guard cylinder 10, it is necessary to provide means to prevent the fluid from operating the cylinder 10 every time the brake is operated. For this purpose, I provide a solenoid valve 16, Fig. 3, which will prevent the fluid from entering the cylinder 10 unless it is desired to operate the said cylinders. The fluid is directed into the valve by the inlet 17 and out of the valve by 18 when the ball check 19 is unseated. To unseat the ball check 19 the operator of the vehicle will throw on a switch, located on dash board and energize the solenoid 20 which will draw up the plunger 21 and unseat the ball check 19. The switch is kept at the "on" position while the fluid is pumped into the cylinder 10 by means of the brake pedal. When the bumpers 14 are fully lowered, that is, when the piston has travelled its maximum distance, the piston, per se 22 will reach the bottom of the cylinder and press against a spring loaded pin 23 which will act against the lever 24. The lever 24 is pivoted to the cylinder 10 by means of a bracket 25. The action of the lever will press against a button switch 26 which is connected to a light on the dash. This action will immediately energize the light which will indicate to the operator that the piston is fully lowered at which time the valve switch is released and the spring loaded ball check 19 falls back in its original position to block the return path of the oil trapped in the cylinder 10.

In practice, the device operates as follows:

When the operator "backs" the vehicle with the guard in the lowered position, and comes in contact with an obstacle, the bumpers will be displaced from the depending vertical position since they are pivotally secured by means of the axles 11. When they are displaced, a boss 27 mounted on the rear of the cylinder will engage a push button switch 28 which is connected to the horn of the vehicle and sound the latter.

The sounding of the horn is a signal to the operator that the vehicle has come in contact with an obstruction. Since the bumpers are at a distance from the wheel, the operator has sufficient time to apply his brakes before driving over the obstacle and since these obstacles may be small children, serious accidents can be avoided by the use of my device.

When it is desired to travel at normal truck speed the valve 16 is energized to open valve 19 and the spring 29, in the cylinder 10 will return the piston to its original position, thus, returning the fluid to the master cylinder.

Bumper guards of this type have the advantage by adding cross members to which a person could "hold on to" should they fall at the rear or front of the vehicle while it is in motion.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

A vehicle wheel guard comprising a pair of cylinders pivotally suspended from the frame of the vehicle for swinging movement in a direction longitudinally of the vehicle frame, pistons mounted to reciprocate in said cylinders having piston rods extending from the bottom of the cylinders, bumper bars attached to said piston rods extending transversely of the vehicle, a fluid pressure line connected to the upper end of said cylinders, a spring closed valve in said fluid line to control the flow of fluid to and from said cylinders, solenoid actuated means for unseating said valve to admit fluid into said cylinders to move the pistons downward to lower the bumper bars, a spring below said pistons for moving said pistons upward to raise the bumper bars when the fluid pressure is released, and signal means actuated by the swinging movement of said cylinders when the bumper bars strike an obstacle.

THOMAS JAMES O'MEARA.

REFERENCES CITED

The following references are of record in the file of this patent:

UNITED STATES PATENTS

| Number | Name | Date |
|---|---|---|
| 1,285,002 | Bober | Nov. 18, 1918 |
| 2,259,614 | Chang | Oct. 21, 1941 |
| 2,407,018 | MacKenzie | Sept. 3, 1946 |
| 2,444,635 | Dennis, Jr. | July 6, 1948 |